UNITED STATES PATENT OFFICE.

WILLIAM T. BONNER, OF TRENTON, NEW JERSEY, ASSIGNOR OF ONE-HALF TO K. P. McELROY AND ROY F. STEWARD, BOTH OF WASHINGTON, DISTRICT OF COLUMBIA, AND MITFORD C. MASSIE, OF NEW YORK, N. Y.

PLASTICS AND PROCESSES OF PRODUCING SAME.

1,173,337.  Specification of Letters Patent.  Patented Feb. 29, 1916.

No Drawing.  Application filed May 6, 1911. Serial No. 625,437.

*To all whom it may concern:*

Be it known that I, WILLIAM T. BONNER, a citizen of the United States, residing at Trenton, in the county of Mercer and State of New Jersey, have invented certain new and useful Improvements in Plastics and Processes of Producing Same, of which the following is a specification.

This invention relates to plastics and methods of producing same; and it comprises a method of producing a plastic material wherein an ester of cellulose with an organic acid is dissolved in a reaction product of a phenol with formaldehyde, the solution produced being subsequently, if desired, heated to condense such reaction product and form a relatively hard compound plastic; and it also comprises as a new composition of matter a solution of cellulose acetate, or of other cellulose esters of low inflammability, in a condensation product of formaldehyde with a phenol; all as more fully hereinafter set forth and as claimed.

Cellulose acetate, as well as the other esters of cellulose with organic acids, such as the formate, butyrate, benzoate, stearate, etc., are excellent plastic materials for many purposes, such as films, threads, insulations, and the like, but suffer the disadvantage that they are not well suited for making molded articles since no solid solvents are known which will give, with these cellulose esters, materials capable of becoming plastic when heated. Where a substance is made plastic by solution in or softening by a volatile solvent, it naturally shrinks after molding and drying; and the only satisfactory plastics for molding purposes are those which can be worked hot and which become hardened on cooling. Camphor and several other bodies will give such heat-plastics with nitrocellulose; but no satisfactory similar "solid solvent" has been known for the esters of cellulose with the organic acids. It is one purpose of the present invention to provide a solvent which will enable the hot-molding of such esters.

As is well known, formaldehyde condenses with the various phenols to form liquid or soft bodies which are susceptible of further condensation to produce hard materials. Ordinary phenol and aqueous formaldehyde, for example, when heated together form what is known as, and may conveniently here be designated as, a "crude reaction product." This body may be liquid or may be soft or waxy. It is presumed that in aqueous solution, formaldehyde acts like the hypothetical methylene glycol and condenses with phenols to form phenol-alcohols; which are supposed to form the major part of the crude reaction product. The reaction may be accelerated by the presence of acid or alkali, but these bodies are merely facilitating or catalytic reagents, taking no part in the reaction proper except where using organic acids.

On heating the crude reaction product, either under pressure or *in vacuo*, further condensations of uncertain nature take place with elimination of water vapor and the material becomes harder and harder, producing resinous bodies. The reactions differ somewhat with the pressure, but are, generally at least, the same in kind. The longer continued is the heating, the less soluble the products become in ordinary solvents. One of the first products of heating is, for example, a clear resin much like shellac and soluble in alcohol. Later, a product is formed much like gum kauri and insoluble in alcohol. In practice, the character of the material may be varied, within limits, by the character and duration of the heating.

I have found that cellulose acetate and other cellulose esters of organic acids are soluble in the crude reaction product and can be molded with it hot, to form molded articles such as sheets, films, cakes, layers and the like of any thickness or shape desired. The molded article being made without the use of a volatile solvent does not shrink materially in cooling. Phenol and formaldehyde may be allowed to react together in water, using, if desired, an excess of formaldehyde. Soda or hydrochloric acid, or any other facilitating reagent, may be employed and is convenient, but is not necessary. The first product, using ordinary phenol or carbolic acid, is a liquid. As the reaction goes further the material becomes more consistent and may finally be waxy. With any of these products cellulose acetate or other cellulose ester may be incorporated at any time prior to final hardening. As long as it remains liquid or fluent, the ester may be incorporated to give a solution. The ester will dissolve in the liquid product freely. A solution may be made of any consistency desired. On heating this mixture the reaction product softens with the heat and may be molded and worked in any way desired. It may be sheeted in the same manner as uncured rubber. While heating will ultimately convert the material into a hard and solid composite mass or solid solution of the ester in a resinous body, yet the first effect of heating is merely to soften the mass, and while soft it may be worked and molded. Other phenols than ordinary phenol or carbolic acid may be employed, such as the cresols, naphthols, etc. Products of wood tar may be employed where dark colored bodies are desired. Other aldehydes than formaldehyde may be substituted but do not work as well in most cases. Formaldehyde is particularly reactive with the phenols.

The specific article of the present case may be employed as such without fillers where dense transparent bodies are desired. Fillers may be employed for making opaque articles; such fillers, for example, as zinc white, asbestos, whiting, sawdust, etc. Other plastics, such as celluloid may be incorporated if desired. Since casein is soluble in phenol, as is the present material, the latter may be readily worked up with phenol solutions of casein.

In a typical embodiment of the present invention, I may mix by agitation say 60 parts of commercial phenol or carbolic acid with 50 parts of the ordinary commercial 40 per cent. formaldehyde solution, the proportions given being by weight. This mixture may be placed in a sealed digester and heated, preferably by steam until the reaction of the phenol and formaldehyde has gone far enough for the present purposes. An open digester provided with a reflux may also be used but the reaction requires a little more time than where operation is in a closed vessel under some pressure and, consequently, under a heightened temperature. Time and temperature are reciprocal factors. At a temperature of 260° F. a suitable reaction product may be formed in five hours. The product formed will be found as a separate layer under a layer of spent liquid, consisting mainly of water carrying in solution whatever accelerating chemical may have been used, such as a little soda or acid. One or two per cent. of hydrochloric acid will hasten reaction. After the reaction is completed to the extent desired, when using a closed digester under pressure I may open a relief valve and allow much or all of the water to blow off as steam, at say 215° to 220° F.

In obtaining a strictly neutral product, I may proceed as first described except that I add 40 parts of commercial phenol to 60 parts of 40 per cent. formaldehyde solution. When the reaction is completed to the extent desired, that is, the product has the desired consistency, and the test shows that it contains no free phenol, I may open a relief valve on the digester and allow the excess of formaldehyde and water to blow off, condensing, if desired, in a coil to regain formaldehyde solution. The material blown off may of course be passed into water. With the reaction allowed to go to an extent advantageous for the present purposes, the reaction product may have about the consistence of honey. A good composition for many purposes may be made by taking 1.5 part of this reaction product to 1 part of cellulose acetate by weight and grinding together, or passing through warm rollers until a flexible semi-plastic material is obtained. This can be made into hard shaped or molded bodies by molding and heating. In the heating, vacuum, pressure or atmospheric pressure may be employed. The longer the heating the harder the material becomes and the less soluble in solvents. The product is in looks not unlike celluloid but is not so inflammable neither does it soften or become affected by heat to such an extent. It is so dense that it burns with great difficulty.

In the hardening of the reaction product, whether containing the ester or no, temperature and time are in a way reciprocal; that is, the material will harden in time quite materially, even though not heated. The same is true of the fluent solutions of the cellulose esters in the material. Useful paints and varnishes may therefore be made by incorporating cellulose acetate or other cellulose esters of low inflammability with a reaction product in such proportions as to make a liquid fluent mass. Such compositions may be spread as varnishes or as paint vehicles, proper pigments being incorporated, and allowed to dry naturally. For varnish making purposes however it is better to incorporate the cellulose acetate or other ester in the composition, heating the mixture until the reaction product becomes resinous and of, say, the general nature of shellac, and then add a solvent, such as alcohol, in the amount desired. Benzol may be used as a solvent.

What I claim is:—

1. In the manufacture of plastics the process which comprises producing a fluent reaction product of formaldehyde and a phenol and dissolving therein while still in a fluent condition an ester of cellulose with an organic acid.

2. In the manufacture of plastics the process which comprises producing a fluent reaction product of formaldehyde and a phenol and dissolving cellulose acetate therein while such product is still in a fluent condition.

3. The process of producing plastics which comprises dissolving an organic acid ester of cellulose in a reaction product of formaldehyde and a phenol while such product is still in a fluent condition.

4. The process of producing plastics which comprises incorporating cellulose acetate with a fluent reaction product of formaldehyde and a phenol while such product is still in a fluent condition.

5. The process of producing plastic articles which comprises producing a fluent reaction product of formaldehyde and a phenol, dissolving in such reaction product an ester of cellulose with an organic acid in amount sufficient to produce a fluent composition, shaping said composition and hardening.

6. The process of producing plastic articles which comprises producing a fluent reaction product of formaldehyde and a phenol, dissolving cellulose acetate therein to produce a fluent composition, shaping said composition and hardening.

7. The process of producing plastic articles which comprises producing a fluent reaction product of formaldehyde and a phenol, dissolving in such reaction product an ester of cellulose with an organic acid in amount sufficient to produce a fluent composition, shaping said composition while in a heated condition and continuing the heating to harden the mass.

8. The process of producing plastic articles which comprises producing a fluent reaction product of formaldehyde and a phenol, dissolving cellulose acetate therein to produce a fluent composition, shaping said composition while in a heated condition and continuing the heating to harden the mass.

9. As a new composition of matter, a solution of an ester of cellulose with an organic acid in a reaction product of formaldehyde and a phenol.

10. As a new composition of matter, a solution of cellulose acetate in a reaction product of formaldehyde and a phenol.

11. A plastic material comprising an organic acid ester of cellulose incorporated with a reaction product of formaldehyde and a phenol.

In testimony whereof, I affix my signature in the presence of witnesses.

WILLIAM T. BONNER.

Witnesses:
W. A. FURMAN,
WM. N. MILLER.